United States Patent [19]

Chang

[11] Patent Number: 5,414,633
[45] Date of Patent: May 9, 1995

[54] PATH CONTROL METHOD OF TOOL WITHDRAWAL AND RESUMPTION IN CNC

[75] Inventor: Yih F. Chang, Hsinchu, Taiwan, Prov. of China

[73] Assignee: Industrial Technology Research Institute, Hsinchu, Taiwan, Prov. of China

[21] Appl. No.: 993,695

[22] Filed: Dec. 21, 1992

[51] Int. Cl.⁶ .................. G06F 15/46; G05B 19/18
[52] U.S. Cl. .................. 364/474.32; 364/474.17; 364/474.34
[58] Field of Search .............. 364/474.32, 474.14, 364/474.15, 474.16, 474.17, 474.18, 474.19, 474.20, 474.22, 474.28, 474.33, 474.34

[56] References Cited

U.S. PATENT DOCUMENTS

| | | | |
|---|---|---|---|
| 4,442,493 | 4/1984 | Wakai et al. | 364/474.32 |
| 4,575,791 | 3/1986 | Schwefel | 364/474.32 |
| 4,604,560 | 8/1986 | Inagaki et al. | 364/474.32 |
| 4,714,999 | 12/1987 | Kiya et al. | 364/474.30 |
| 4,723,219 | 2/1988 | Beyer et al. | 364/474.32 |
| 4,839,817 | 6/1989 | Fujimoto | 364/474.32 |
| 5,150,306 | 9/1992 | Kawamura et al. | 364/474.02 |

Primary Examiner—Roy N. Envall, Jr.
Assistant Examiner—Thomas E. Brown

[57] ABSTRACT

The path control method of tool withdrawal and resumption in CNC operation is capable of moving the tool along a prescribed path to a reference point to wait for the removal of interrupting factor. Upon the termination of interruption signal, the tool is then moved along the prescribed path from the reference point to the interruption point where the tool resumes its operating activities. If the termination of interruption signal takes place when the process of tool withdrawal is in progress, the tool in question is then instructed by CNC to reverse it course of movement ot return to the interruption point so as to resume its operating chores. The control of tool paths during the process of withdrawal and resumption is further enhanced by an addition of several sets of defined path status in relation to the interruption existence.

2 Claims, 11 Drawing Sheets (From Fig. 4a)
I
↓

Establishing OT status, backup operation variables, establishing parameter of movement to rf3 point, parameter establishment of interruption signal ↓
A'
(To Fig. 4a)

(From Fig. 4a)
A
↓
B'
(To Fig. 4a)

PATH CONTROL METHOD OF TOOL WITHDRAWAL AND RESUMPTION IN CNC

BACKGROUND OF THE INVENTION

The present invention relates to CNC operation, and more particularly to a progrdmmed path control method of tool withdrawal and resumption in CNC operation.

A continuous and uninterrupted CNC operation is an objective to be accomplished by the manufacturers of factory automation; nevertheless it is often difficult to keep CNC operation in progress steadily during a lengthy machining process. The manufacturers of CNC machineries are therefore interested in developing the technology capable of diagnosing the operational condition of the CNC machinery to prevent the machinery from being damaged accidentally by an unforeseen situation brought about sporadically and to avoid an unnecessary delay in the production process.

When the machining process is found to be in trouble, the CNC operation in progress must be first stopped to allow the machine operator to withdraw the tool manually from its working position so as to correct the situation in order to permit the interrupted tool to resume its operation from the process point at which it was interrupted previously. If the discharge process of CNC is found to be operating abnormally, it is then very likely that the withdrawal of the electrode is called for. Under such circumstance, an automatically controlled method of tool withdrawal and resumption is needed in order to improve the production efficiency.

It is a well-known fact that the operational control of a CNC machinery is generally achieved by means of interpolation, which undertakes the linear or circular arc blocks based on the operational information transmitted from a specific part program of the CNC machinery, and that it is a rather tedious and time-consuming task to withdraw the tool until such time when the interrupting culprits are corrected and subsequently to make the withdrawn tool to move back to the point, where it was interrupted previously, in order to be ready to resume its unfinished job. According to the technology used currently in the CNC electroerosion process, the path of tool withdrawal is specifically controlled by a vector method, in which the electrode is made to withdraw immediately in that direction as soon as the discharge process of CNC is operating erratically, and in which the electrode is made to return to the point, where it was interrupted, along the original path of its withdrawal when the discharge process of CNC is made to resume its operation regularly. However, such method as described above is limited in that it is not provided with means to drive the cutting tool or electrode to a certain end position in order to let CNC check on the abnormal process.

SUMMARY OF THE INVENTION

It is therefore the primary objective of the present invention to provide a path control method of tool withdrawal and resumption in CNC operation, in which the tool involved in an automated production process can be withdrawn whenever an irregularity of CNC operation takes place, and in which the interrupted tool can be made to resume its prescribed function as soon as the interrupting factors have been corrected.

It is another objective of the present invention to provide a path control method of electrode withdrawal and resumption in CNC EDM operation, in which an effective method of controlling withdrawal and resumption of the electrode during the CNC discharge process is provided in order to improve the over-all efficiency of production.

The foregoing features, objectives, and advantages of the present invention will be better understood by studying the following detailed description of the preferred embodiment, in conjunction with the drawings provided herein.

BRIEF DESCRIPTION OF THE DRAWINGS

FIG. 8 shows from branch flow chart from FIG. 4 a process of making the path status judgment during the travel of tool withdrawal and resumption (application example).

The symbols used in the specification of the present invention are illustrated as follows:

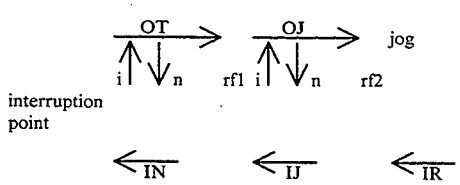

rf1: reference point 1 (turning point)
rf2: reference point 2 (turning point)
i: reoccurrence of interruption
n: termination of interruption
OT: the status of tool withdrawal at the time when the tool being moved to the point designated as rf1 during the interruption
OJ: the status of tool withdrawal at the time when the tool being moved to the point designated as rf2 during the interruption
IR: the status of tool resumption at the time when the tool being returned to the point designated as rf2 upon the termination of interruption IJ: the status of tool resumption at the time when the tool being returned to the point designated as rf1 upon the termination of interruption IN: the status of tool resumption at the time when the tool being returned to the interruption point upon the termination of interruption JOG: manual progressive forwarding

DETAILED DESCRIPTION OF THE PREFERRED EMBODIMENT

Figure 1:
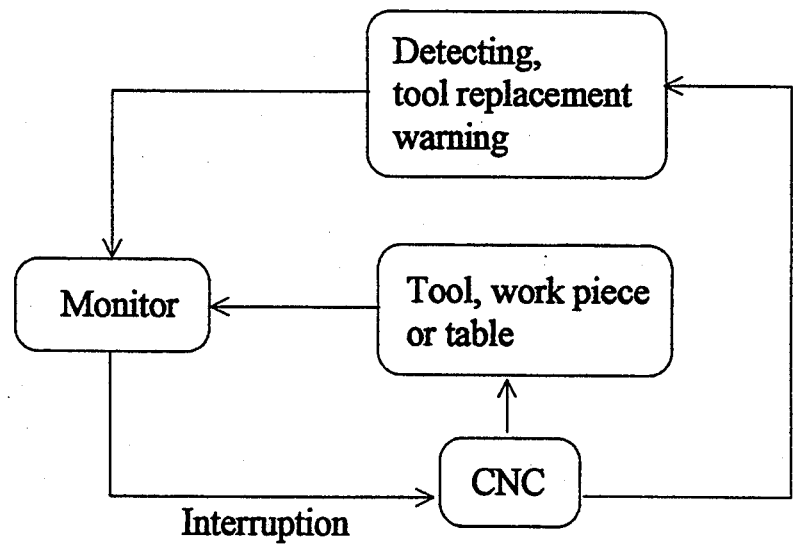
FIG. 1 is a block diagram of a CNC machine tool equipped with a tool monitor.

Referring to FIG. 1, the CNC machine tool device embodied in the present invention is shown comprising a tool monitor, which is used to detect any abnormal operation, such as an irregular vibration of the tool, and to send out the interruption signal to CNC, which brings the production process in progress to a halt and subsequently withdraws the tool to position at an inspection point where the tool is subsequently checked upon and replaced, if necessary. Upon the termination of such interruption, the CNC is instructed to send back the inspected or replaced tool to the interruption point where the returned tool resumes its prescribed function to complete the unfinished job.

Figure 2:
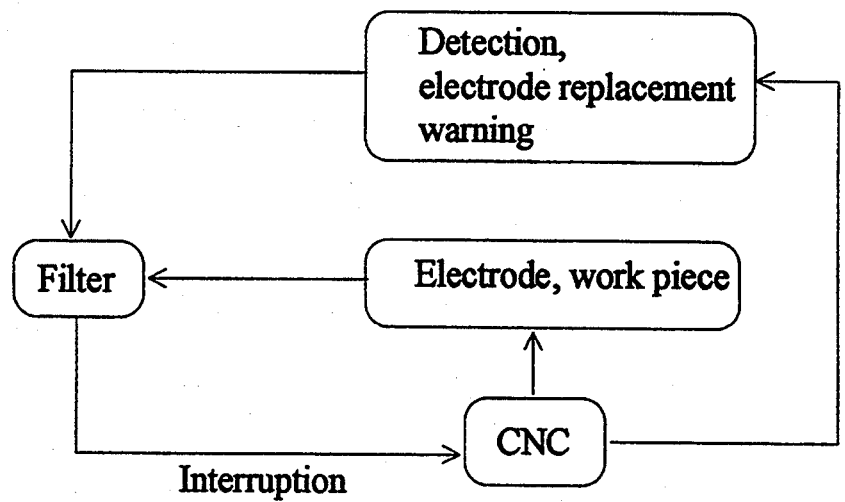
FIG. 2 is a block diagram of a CNC electric discharge machine.

As shown in FIG. 2, an interruption signal is transmitted to CNC which, in turn, triggers the work stoppage of the production process in progress, when signal filter detects irregular discharge activities, such as short circuit, carbon deposit, etc. As a result, the tool is moved by CNC to a predetermined inspection position. However, if the signal filter detects that normal discharge can be carried out as usual, the termination signal is then sent to CNC, which in turn makes the electrode to move back to the interruption point in order to resume the production process.

It is essential that a feasible path is provided for an appropriate movement of the tool and that CNC is provided with a turning point to overcome the possible spatial restriction. According to the present invention, two reference points rf1 and rf2 are provided as turning points. The second reference point can be arranged at the inspection position to facilitate the inspection of tool (or electrode) in the wake of the process interruption.

In order to satisfy the demands described above, the control method of the present invention includes the functions expounded hereinafter.

At the outset of an operational interruption of CNC, the tool moves along a programmed path to reach a reference point rf2 via a pre-arranged reference point rf1 to await a JOG motion to be done manually by the operator. In the meantime, an attempt is made to remove the interruption. As soon as the interruption is brought to an end, the interrupted tool returns along the original path to the interruption point so as to continue doing its unfinished job. If the interruption signal is terminated while the process of tool withdrawal is in progress, the tool will be instructed to reverse its course immediately and to travel along the original path to return to the point of interruption so as to continue doing its unfinished job. If the interruption signal is triggered again while the process of tool resumption is in progress, the tool will be once again instructed to reverse its course immediately so that the process of tool withdrawal is resumed. As long as interruption signal remains in force, the operator can "JOG" the tool at the reference point rf2. When interruption signal is terminated, the tool will return automatically to the reference point rf2 to wait for further instruction.

In order to maintain the integrity of interpolator additional decision-making programs are added to the interpolator. In order to reinforce the functions of tool withdrawal and resumption, the path status is defined so that the decision about the status of the path and the movement of the tool conform to the definitions of the path status. The end of the path for tool withdrawal is connected with JOG so as to facilitate the operator to move the tool at will in an attempt to correct the culprit responsible for the interruption of operation.

Figure 3:
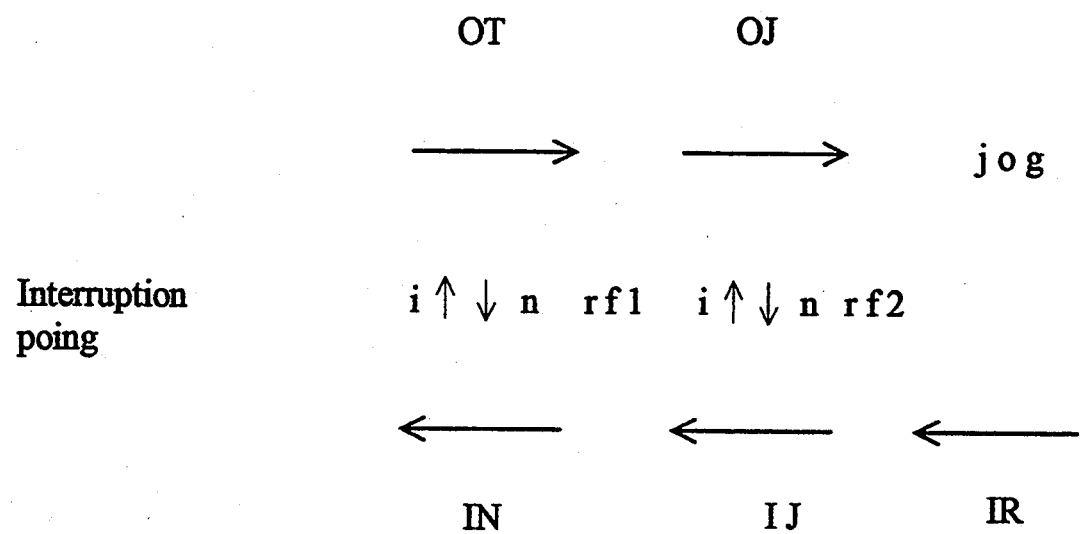
FIG. 3 shows a schematic view of the path status of tool withdrawal and resumption.
Figure 4A:
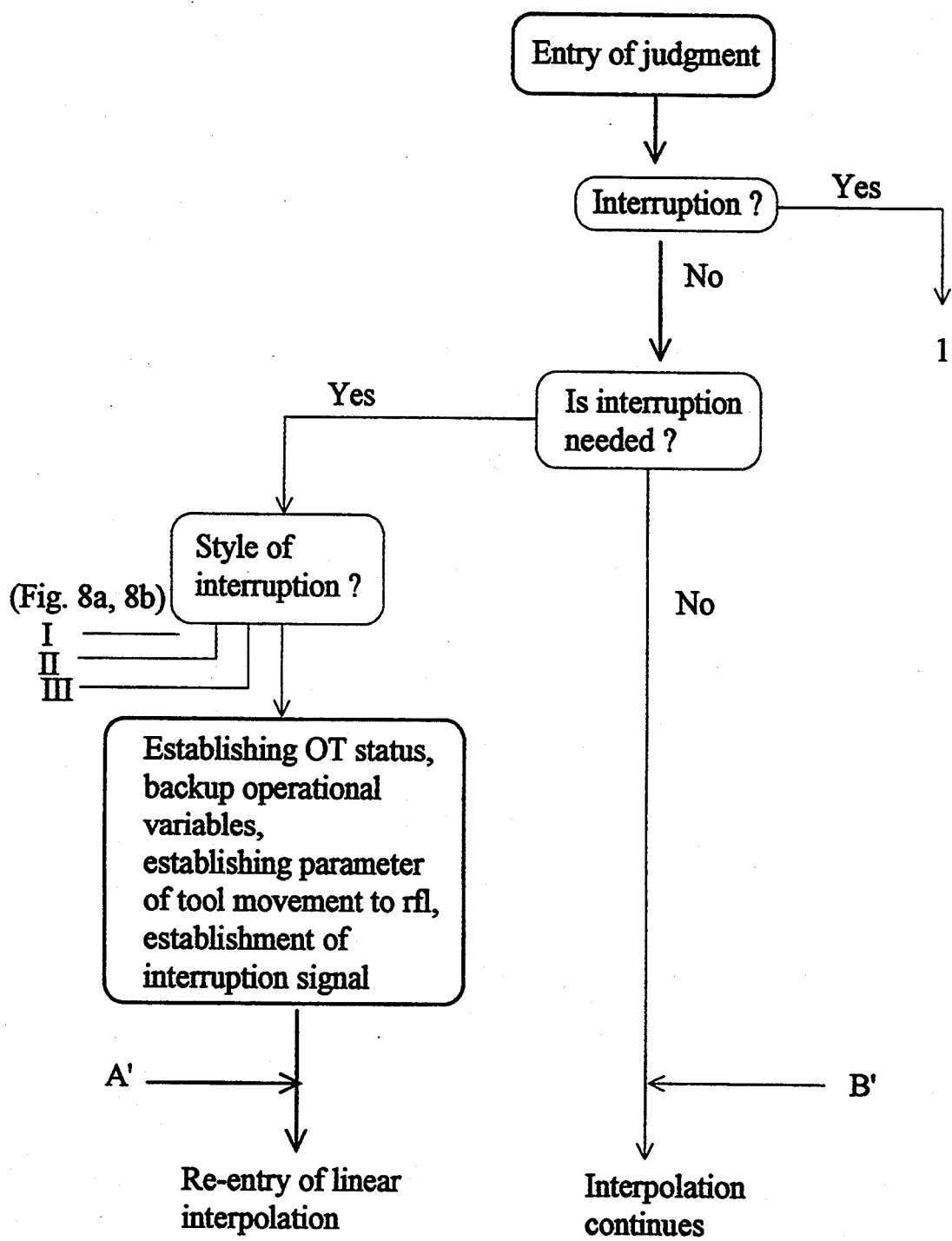
FIG. 4 shows a process of making the path status judgment during the travel of tool withdrawal and resumption.
Figure 4:
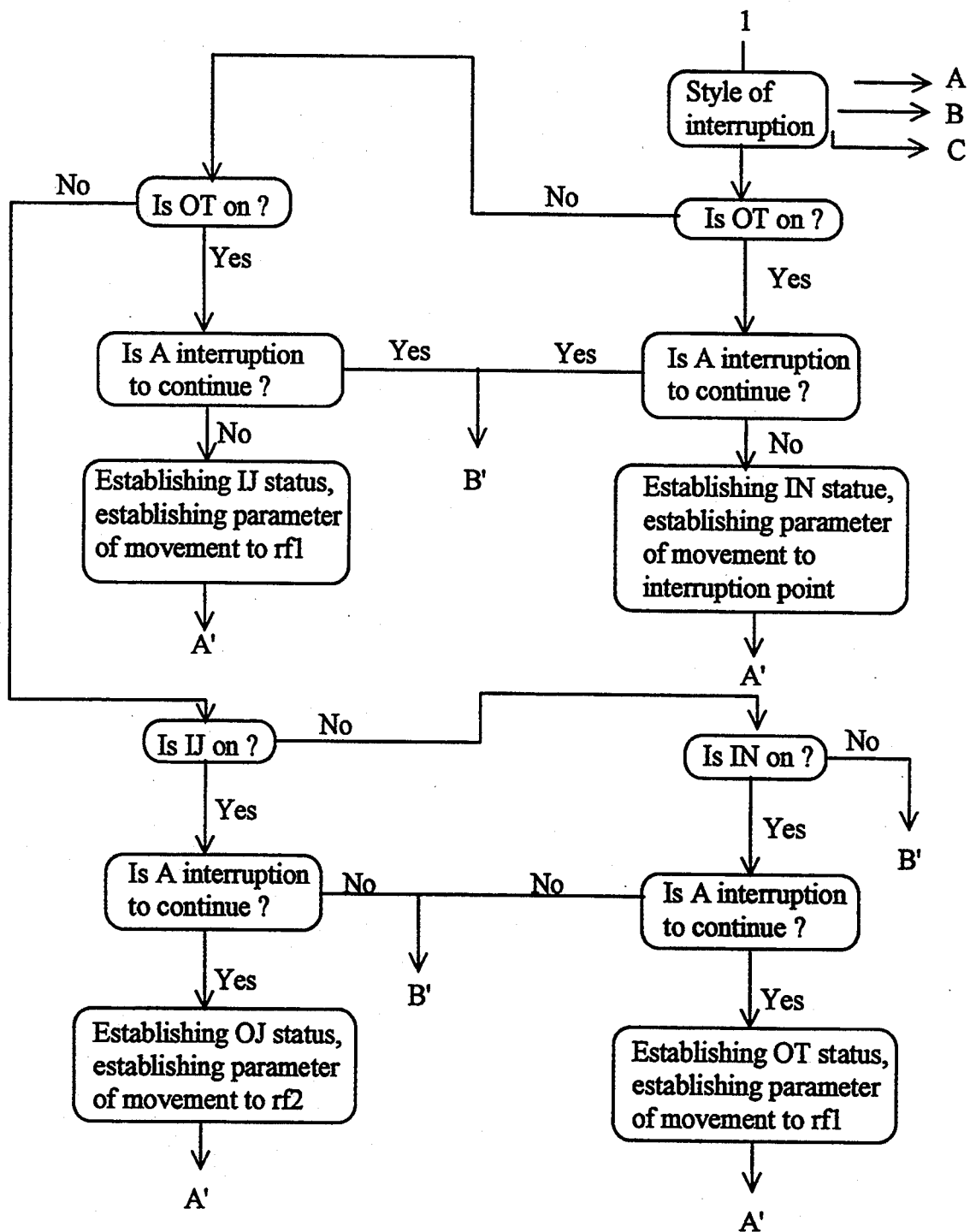
Figure 5A:
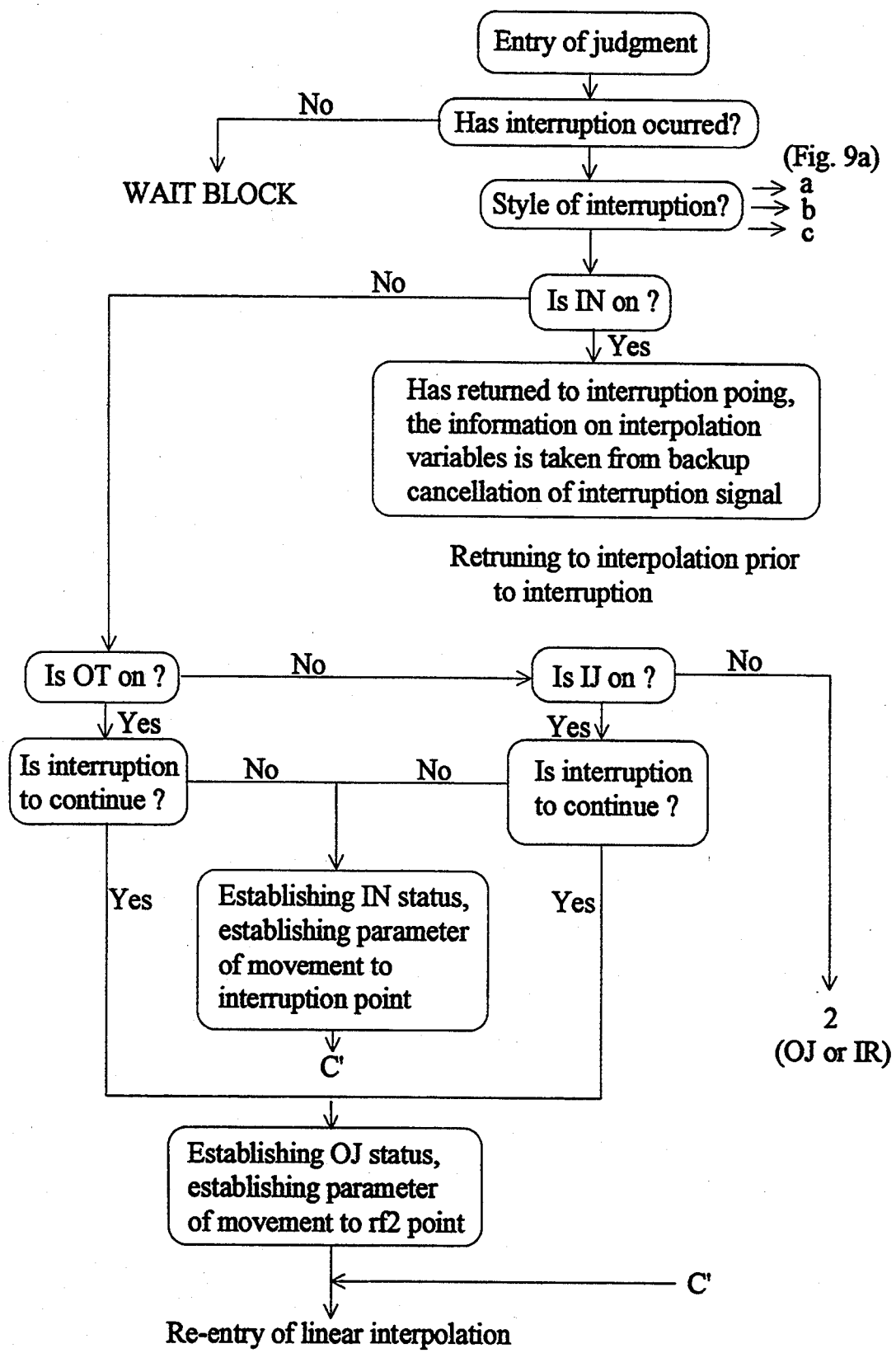
FIG. 5 shows a process of making the path status judgment at the turning point of tool withdrawal and resumption.
Figure 5B:
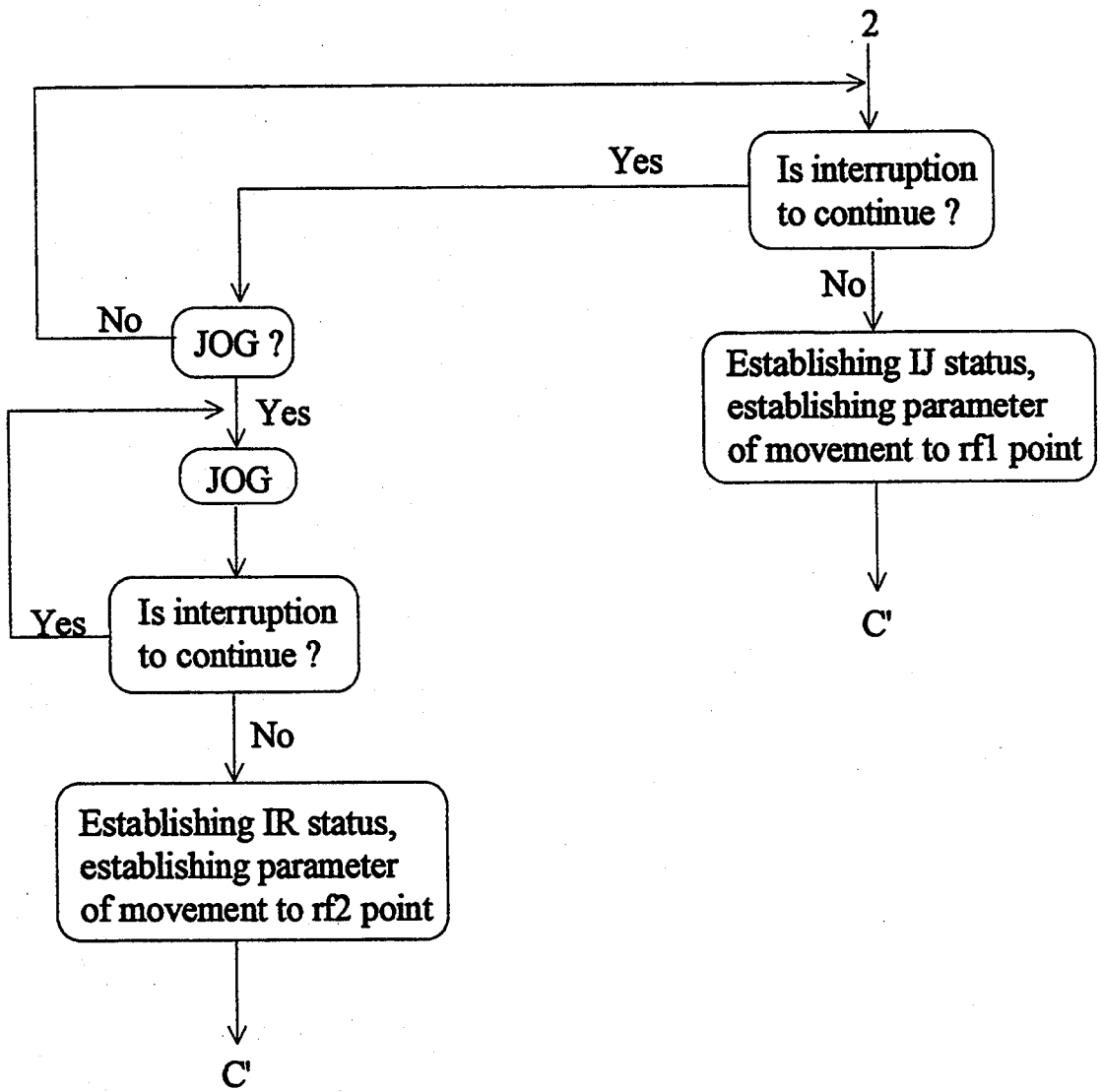

Accordingly, the control of tool paths and the status of paths are shown in FIG. 3. For the purpose of making the control method of this invention applicable to a traditional interpolator the control method includes two sub-programs: a decision-making in the midst of movement as shown in FIG. 4, and a decision-making at the turning point as shown in FIG. 5. These two sub-programs are arranged respectively in two positions inside the interpolator as shown in FIG. 6.

Therefore, the interpolator is capable of making decision if an interruption takes place in the midst of movement. If no interruption occurs, the interpolator will bypass the first sub-program mentioned above and proceed to do the interpolation. If interruption takes place, the device is locked into OT and the contents of the variables in the interpolator are stored in the memory of the device. In addition, the reference point rf1 is set as the destination of the movement. Accordingly, the device begins doing the linear interpolation in preparation for execution of the tool movement to the reference point rf1. The status of the linear interpolation is designated as OT.

As shown in FIG. 3, the status of the tool movement on the path can be represented respectively by OT, OJ, IJ, IN, and IR in the course of tool withdrawal and resumption. It must be added that the tool may be instructed to move on one of the path to another path with opposite direction if there is a change in the interruption status. For example, as long as interruption signal persists, the tool is instructed to remain in the OT status and to move to rf1, or to remain in the OJ status and to move to rf2, as shown in FIG. 4. If interruption signal remains in force in OT or OJ status, the sub-program is bypassed and the interpolation for the status continues. Upon termination of interruption signal, the tool has not moved to rf1 point or rf2 point. In the meantime, the status must be shifted to IN or IJ, and the destination of the tool movement is set at the interruption point or rf1. Such parameter is used to do the interpolation for the IN status or the IJ status. On the contrary, if there is no interruption signal, the tool must be moved to rf1 under the status IJ, or the tool is moved to the interruption point under the status IN. The control method is shown in FIG. 4. When there is no interruption signal, and the tool resumption is in progress under the status IJ or IN, the interpolation for the status IJ or IN continues, with the sub-program being bypassed. If the interruption signal appears again, the status must be changed to OJ or OT even though the tool has not moved to the rf1 point or the interruption point. In the meantime, the parameter in relation to rf2 or rf1 must be set so as to permit the interpolator to undertake the OJ or OT linear interpolation. In short, as soon as interruption takes place, the tool is set in OT or OJ status. On the other hand, upon the termination of interruption, the tool is turned to IJ or IN status. If the tool is in the JOG status, the tool will be moved on to rf2 point under the IR status upon the termination of the interruption status. There will be no decision-making about the interruption until the tool has reached the rf2 point. If no interruption takes place at this point, it moves on to rf1 under the status IJ. If an interruption takes place, it remains at rf2 to wait for further JOG.

Figure 6:
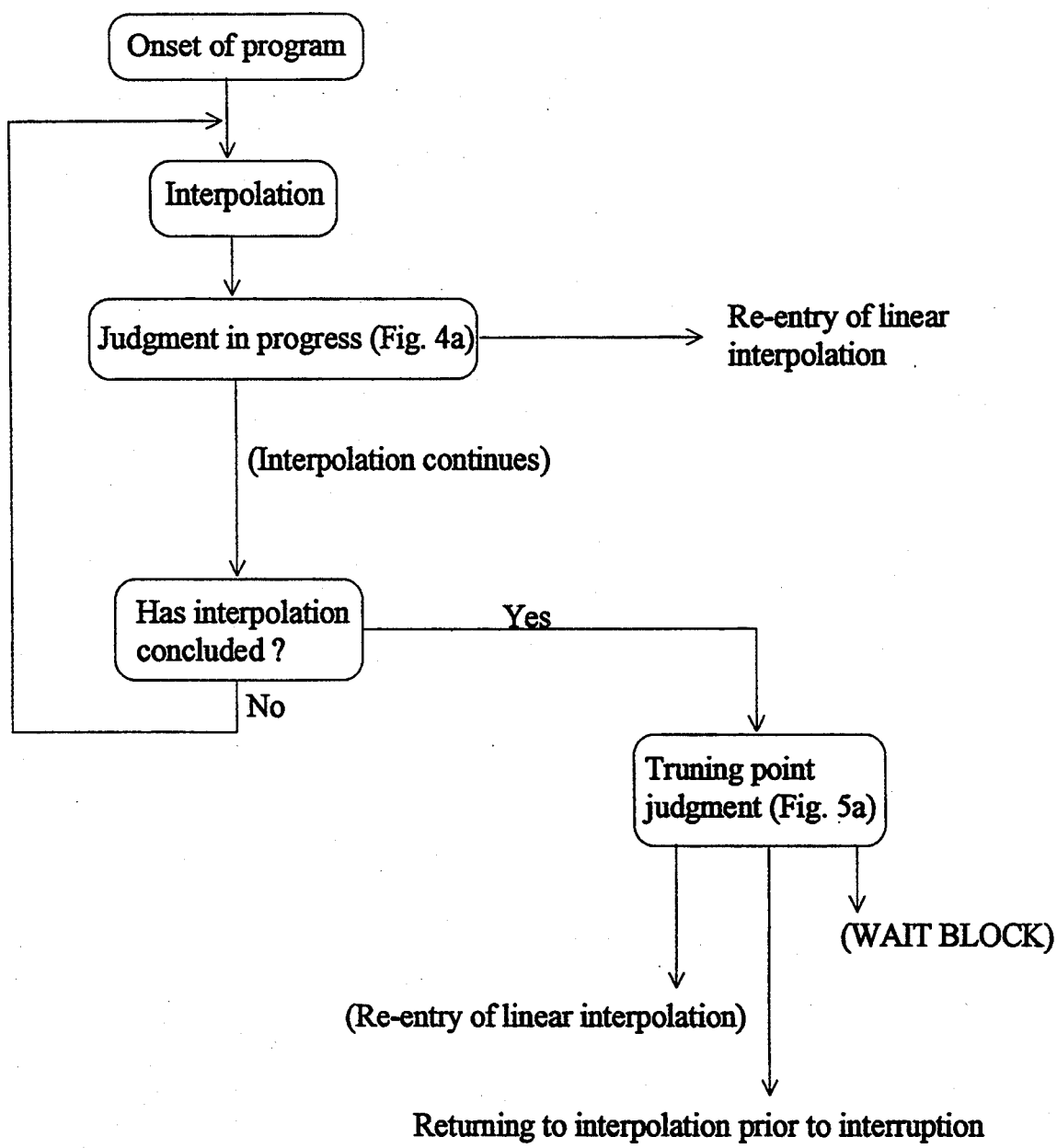
FIG. 6 shows a process of interpolation.

As shown in FIG. 6, once the decision-making as shown in FIG. 4 is added to interpolator, the judgment as to the change in the tool movement after interruption or the continued execution of interpolation can be made.

The tool movement during interruption is accomplished by means of the same linear interpolator. As a result, the linear interpolation is nearly brought to an end when the tool has reached its prescribed destinations, such as interruption point, turning points rf1 and rf2. As shown in FIG. 5, it is about to do the decision-making in connection with path status so as to determine if a linear interpolation for the status or a resumption of linear or circular interpolation prior to interruption is in order.

Entering this decision-making sub-program, it must be first determined if it is in the interruption status. If interruption status does not exist, the interpolation can be brought to an end. Subsequently, the main program is relied upon to accept any new block information. If it is under the interruption status, it must be first determined if the tool has returned to the interruption point when making the judgment in the subprogram. It is obvious because the tool can be moved to the interruption point only under the IN status. Therefore, it can tell if the tool has been moved back to the interruption point by deciding if it is in the IN status. If it turns out to be in the IN status, the information contained in interpolation variables is taken in, and the interruption status is cancelled so as to continue the unfinished interpolation.

If it is not in the IN status, it must be determined for sure if the tool has been moved to rf1 point via the OT status or via the IJ status. If it is, then the decision must be made if the interruption still exists or not. If the interruption continues, it must be changed to OJ status and set the parameter of moving to rf2 point so that the tool can be moved to rf2 point under the OJ status. Upon the termination of interruption, the status is changed to IN, and the parameters of returning to the interruption point are set so that the tool can be moved to the interruption point under the IN status.

The tool must be located at rf2 point, if it is not under IN, OT, IJ status. As a result, it must be in OJ or IR. At this moment, the judgment must be made if an interruption signal exists. If not, the status is changed to IJ, and the parameter of moving to rf1 is set. If interruption signal exists, it must wait for the termination of the interruption signal, thereby allowing the operator to continue doing "JOG", after which the decision must be made if JOG sub-program is no longer needed. If the interruption signal no longer exists after JOG, the tool is then allowed to move to rf2 from the IR status.

As mentioned above, once the decision-making as shown in FIG. 5 is placed in interpolator the judgment can be made if actions taken under interruption should continue or if it should wait for new block information.

Figures 7, 8A, 8B:
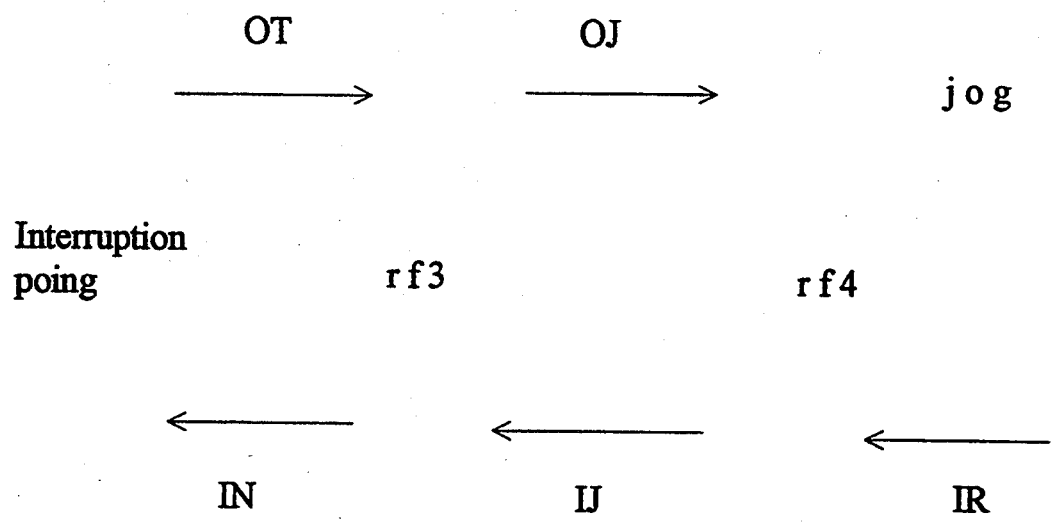
FIG. 7 shows a schematic view of the path status of tool withdrawal and resumption (application example).

The action of JOG mentioned previously can be changed to meet the actual needs of its application. For example, a detecting system can be attached to CNC for detecting and monitoring the status of cutting, such as the tool vibration, the vibration of work piece, the cutting force, tool wear and the like. When an irregularity takes place, the monitor sends out an interruption signal to CNC. The manner by which an interruption is corrected and terminated is dependent on the style of the interruption. For example, if an arc jumping is called for during CNC EDM discharge, the interruption signal is initiated by the detection circuit. The paths of tool withdrawal and resumption can be varied on the basis of the definitions of the reference points. As shown in FIG. 7, the reference points have been changed to rf3 and rf4. As a result, the paths shown in FIG. 7 are different from those shown in FIG. 3.

Because this is a new style of the interruption named as type I, such as shown in FIG. 8(a) the variables of the original interpolation will be stored in the memory and the status will be set as OT after the judgement of the style shown in FIG. 4.

Because the tool is moved directly to rf4 via rf3, or upon the termination of the interruption the tool is moved from rf4, rf3 to the interruption point, the interpolator will bypass the first sub-program mentioned above and proceed to do the withdrew or resumption through the judgement of the style of interruption from FIG. 4-1 to FIG. 8(b).

Figure 9A:
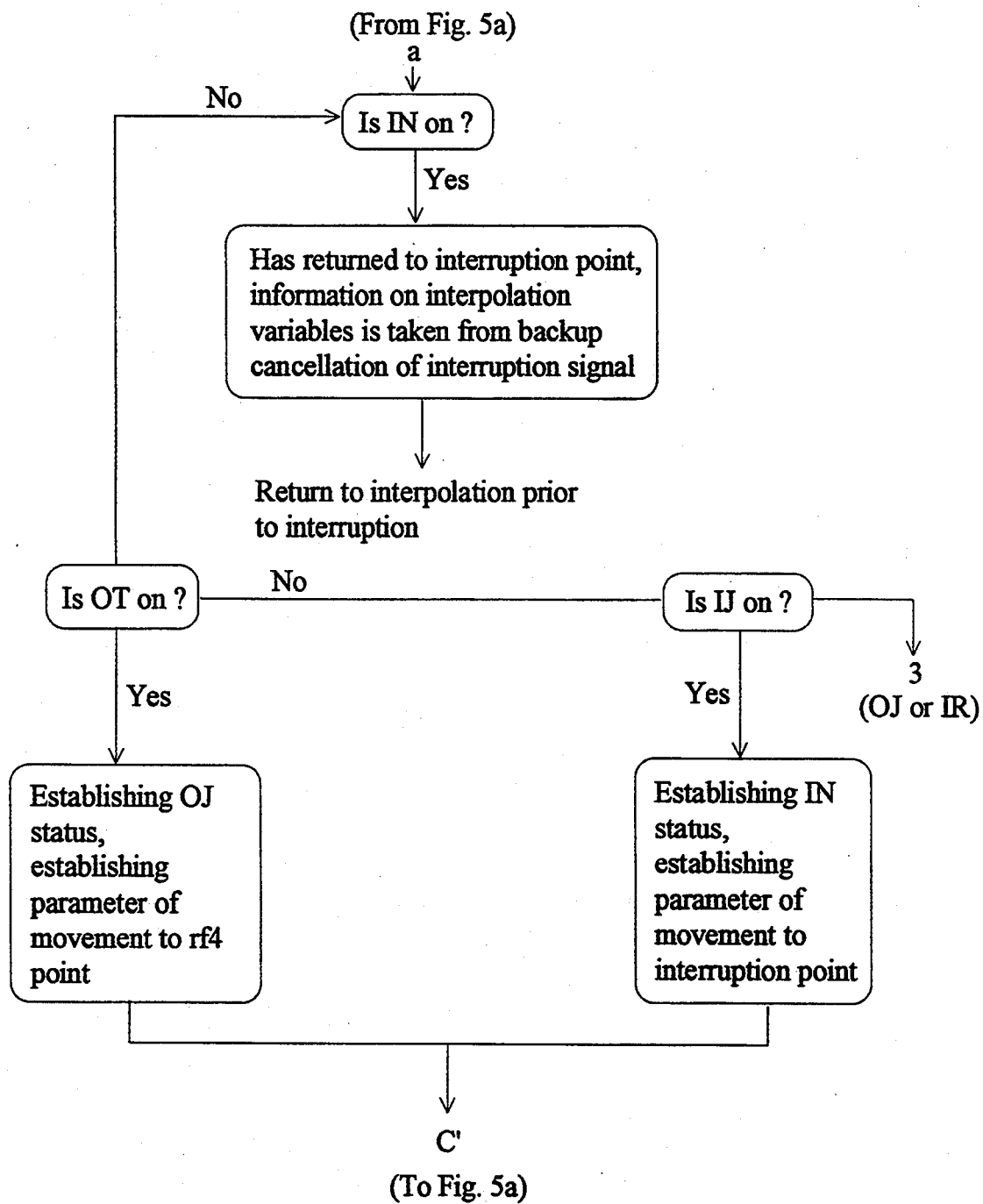
FIG. 9 shows from branch flow chart from FIG. 5 a process of making the path status judgment at the turning point of tool withdrawal and resumption (application example).
Figure 9B:
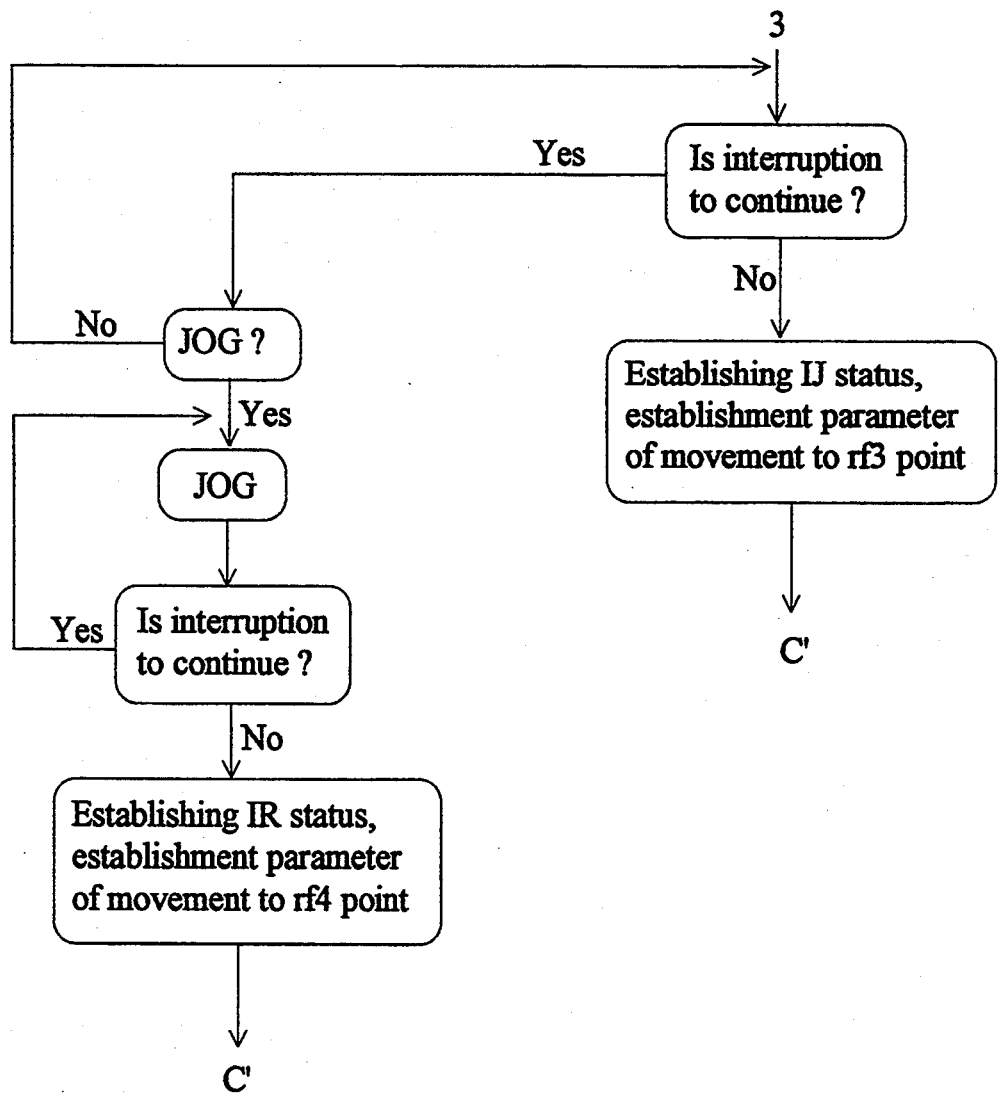

After the interruption the tool has to be driven to the position of rf4 so that the decision can be made if the interruption should continue. Therefore, an additional method of decision-making must be added, as shown in FIG. 9, in which the tool is shown being positioned at rf3 or in the OT status and is then moved to rf4 under the status OJ without making an attempt to decide if an interruption takes place. If the situation is judged to be in IJ status (the tool has moved to rf3), the status IN is thus set. As a result, the tool is moved to the interruption point without judging if an interruption takes place. When the tool has moved to rf4, CNC is then able to proceed to remove the factor responsible for the interruption. At this moment, the decision-making process is capable of judging interruption signal or JOG signal. Upon removal of interrupting factors, CNC terminates the interruption signal and subsequently send the tool back to the interruption point where the tool resumes its operation to continue doing its unfinished chore.

Upon determination of the paths of tool withdrawal and resumption, a variety of interruption actions can be taken as illustrated hereinafter.

Figure 10:
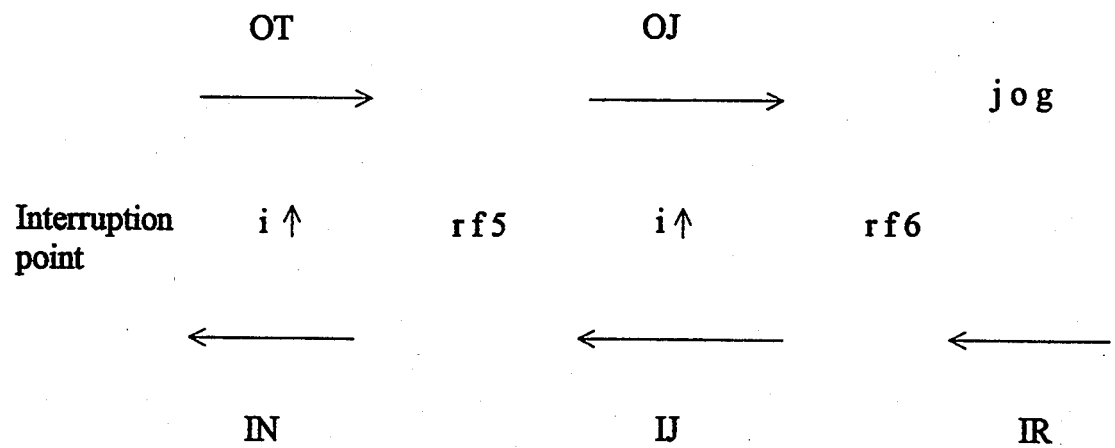
FIG. 10 shows a schematic view of the path status of tool withdrawal and resumption (application example A).

(1) As shown in FIG. 10, as soon as an interruption signal is initiated, CNC drives the tool to move directly to rf6 from rf5 to wait for further instruction, without having to judge if the interruption signal has been terminated. Upon the termination of interruption, the tool located at rf6 is then moved back to the interruption point. If an interruption takes place again when the tool is on its way back to the interruption point as mentioned previously, the tool in question is then sent back along the originally prescribed path to rf6 to wait for further instruction.

Figure 11:
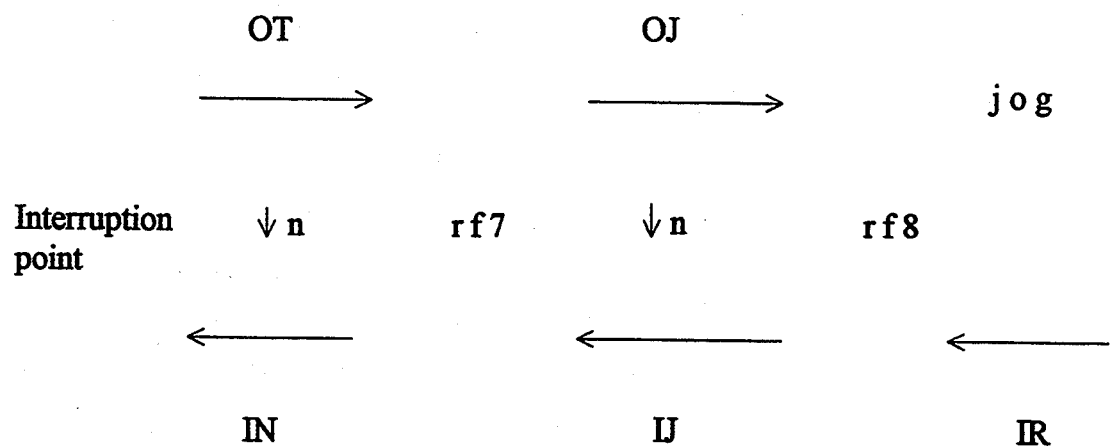
FIG. 11 shows a schematic view of the path status of tool withdrawal and resumption (application example B).

(2) As shown in FIG. 11, as soon as an interruption signal is sent out, CNC drives the tool to move along the prescribed path from rf7 to rf8. As interruption signal is terminated, the tool travels along the originally prescribed path to the interruption point, without having to make a judgement if an interruption signal is once again initiated.

These two actions described above can be achieved by means of installing the control method on the methocl in FIGS. 4 and 5 into the interpolation as shown in FIG. 6.

In short, the path control method of tool withdrawal and resumption in CNC operation of the present invention enables CNC machine tool to resume its operation with precision in the wake of being interrupted by maloperational characteristics so as to ensure that the quality of products manufactured by CNC machinery is not compromised, and that the rate of production is improved, and further that the goal of factory automation is achieved.

What I claim is:

1. In a CNC operation, a path control method for tool withdrawal and resumption characterized in that said path control method comprising the steps of:

(a) defining first and second turning points between an interruption point and a destination point:
   (b) defining first and second withdrawal statuses, which will be on when said tool is moving from said interruption point to said first turning point, and from said first turning point to said second turning point, respectively, each of said withdrawal statuses corresponding to a set of predetermined withdrawal path control parameters;
   (c) defining first, second and third resumption statuses, which will be on said tool is moving from said destination point to said second turning point, from said second turning point to said first turning point, and from said first turning point to said interruption point, respectively, each of said resumption statuses corresponding to a set of predetermined resumption path control parameters;
   (d) moving said tool in accordance with an interpolation scheme, said interpolation scheme comprising the following steps:
      (i) deciding whether an interruption signal has be detected, if yes, then deciding if said first withdrawal status is on; if said first withdrawal status is on and said interruption signal continues, then continuing said movement of said tool according to said interpolation scheme toward a destination point, if said interruption signal stops then turning on said third resumption status and returning said tool to said interruption point;
      (ii) if said first withdrawal status is off and said second withdrawal status is on, determining if said interruption signal continues, if yes, then continuing said movement of said tool toward said destination point, if said interruption signal stops, then turning said second resumption status on and returning said tool to said first turning point:
      (iii) if said first withdrawal status is off and said second withdrawal status is also off, then determining if said second resumption status is on, if yes, then turning on said second withdrawal status and moving said tool to said second turning point if said interruption signal continues, otherwise returning said tool to said interruption point;
      (v) if said first withdrawal status is off and said second withdrawal status is also off, then if said second resumption status is off, then checking whether said third resumption status is on, if said first resumption status is on then turning on said first withdrawal status and moving said tool to said first turning point if said interruption signal continues, otherwise returning said tool to said interruption point; if said first resumption status is off, then returning said tool to said interruption point;
   (e) after moving said tool to said first turning point, checking if said first resumption status is on, if yes then returning said tool to said interruption point, if no then performing the following steps:
      (i) checking if first withdrawal status is on, if yes and said interruption signal continues, then turning said turning said second withdrawal status on and moving said tool to said second turning point, if said interruption signal stops then turning said third resumption status on and returning said tool to said interruption point;
      (ii) if said first withdrawal status is off then checking if said second resumption status is on, if no, then moving said tool to a destination where said tool will be repaired, if yes, then checking if said interruption signal continues, if said interruption continues, then turning said second withdrawal status on and moving said tool to said second turning point, if said interruption signal stops then turning said first resumption status on and returning said tool to said interruption point; and
   (f) said path control method further comprising the step of using a detector attached to a CNC machine to facilitate a correction of factors that may be responsible for causing an interruption of said CNC operation.

2. In a CNC operation, a path control method for tool withdrawal and resumption characterized in that said path control method comprising the steps of:

(a) defining first and second turning points between an interruption point and a destination point;
   (b) defining first and second withdrawal statuses, which will be on when said tool is moving from said interruption point to said first turning point, and from said first turning point to said second turning point, respectively, each of said withdrawal statuses corresponding to a set of predetermined withdrawal path control parameters;
   (c) defining first, second and third resumption statuses, which will be on said tool is moving from said destination point to said second turning point, from said second turning point to said first turning point, and from said first turning point to said interruption point, respectively, each of said resumption statuses corresponding to a set of predetermined resumption path control parameters;
   (d) upon receiving an interruption signal when performing a first interpolation operation, setting said first withdrawal status to an on status and moving said tool to said first turning point according to a second interpolation scheme;
   (e) while moving said tool to said first turning point, if said interruption signal continues, then continuing moving said tool to said first turning, if said interruption signal stops, then setting said third resumption status to an on status and moving said tool to said interruption point according to a third interpolation scheme;
   (f) when said third resumption status is on, if said interruption signal does not reappear then continuing moving said tool to said interruption point, if said interruption signal reappears, then setting said first withdrawal status to an on status and moving said tool to said first turning point;
   (g) upon reaching said first turning point, if said interruption signal continues, then setting said second withdrawal status to an on status and moving said tool to said second turning point according to a fourth interpolation scheme;

(h) after step (f), upon reaching said interruption point, if said interruption signal disappears, then resuming said first interpolation operation which has been interrupted;

(i) after step (g), when moving said tool to said second turning point, if said interruption signal continues, then continuing moving said tool to said second turning point, if said interruption signal stops, then setting said second resumption status to an on status and moving said tool to said first turning point according to a fifth interpolation scheme;

(j) when said second resumption status is on, if said interruption signal does not reappear, then continuing moving said tool to said first turning point, if said interruption signal reappears, then setting said second withdrawal status to an on status and moving said tool to said second turning point; and (k) if said interruption signal persists, then moving said tool from said second turning point to said destination point, where said tool will be repaired by an operator;

(l) said path control method further comprising the step of using a detector attached to a CNC machine to facilitate a correction of factors that may be responsible for causing an interruption of said CNC operation.

* * * * *